United States Patent

[11] 3,619,215

| [72] | Inventors | John C. Bard;<br>Russell H. Maas, both of Madison |
|---|---|---|
| [21] | Appl. No | 775,000 |
| [22] | Filed | Nov. 12, 1968 |
| [45] | Patented | Nov. 9, 1971 |
| [73] | Assignee | Oscar Mayer & Company, Inc.<br>Chicago, Ill. |

[54] HEAT-AND-SERVE PACKAGES FOR PREFRIED BACON AND THE LIKE
12 Claims, 13 Drawing Figs.

[52] U.S. Cl................................................. 99/174,
206/46 F, 229/87 F
[51] Int. Cl..................................................... B65b 25/06
[50] Field of Search........................................... 99/174,
171; 206/46, 45.33; 229/87, 31, 51

[56] References Cited
UNITED STATES PATENTS

| 1,281,722 | 10/1918 | Van Loenen | 206/46 X |
| 1,704,175 | 3/1929 | Coale | 99/174 UX |
| 2,902,396 | 9/1959 | Reynolds | 99/171 X |
| 2,974,854 | 3/1961 | Moore | 99/174 UX |
| 3,092,501 | 6/1963 | Beck | 206/46 X |
| 3,117,875 | 1/1964 | Burns | 99/174 |
| 3,145,112 | 8/1964 | Buegershausen | 99/174 X |
| 3,183,100 | 5/1965 | Bonini | 99/174 X |
| 3,228,168 | 1/1966 | Grindrod | 99/174 X |
| 3,281,051 | 10/1966 | O'Brien | 99/171 X |
| 3,407,077 | 10/1968 | Helin | 229/87 X |
| 3,490,576 | 1/1970 | Alessi | 99/174 X |

FOREIGN PATENTS

| 6,516,404 | 6/1966 | Netherlands | 206/45.33 |

Primary Examiner—Frank W. Lutter
Assistant Examiner—Robert Halper
Attorney—Greist, Lockwood, Greenawalt & Dewey ABSTRACT: Heat-and-serve packages of prefried bacon and the like include a disposable, heatable tray formed with foldable sides from sheet material capable of retaining melted fat, with slices of prefried bacon or the like laid flatwise or shingled on the bottom of the tray. The sides of the tray are folded downwardly and inwardly over the margins of the sliced bacon and the assembly is enclosed in a disposable film envelope being preferably evacuated and hermetically sealed. In use, the outer film or envelope is removed, the sides of the tray are folded up and the tray is inserted in an oven or placed on a hot plate whereby the bacon is heated and acquires the characteristic flavor of bacon fried or cooked in the usual manner. Single or multiple trays may be sealed in an envelope formed of barrier film. A single tray may be folded and multiple trays may be separable into smaller trays. While the invention is particularly useful for sliced prefried bacon, other sliced or generally flat heat-and-serve items may constitute the contents such as prefried slices of Canadian bacon and flattened prefried hamburger and pork sausage patties.

PATENTED NOV 9 1971 3,619,215

INVENTORS
JOHN C. BARD
RUSSELL H. MAAS
BY
ATT'YS.

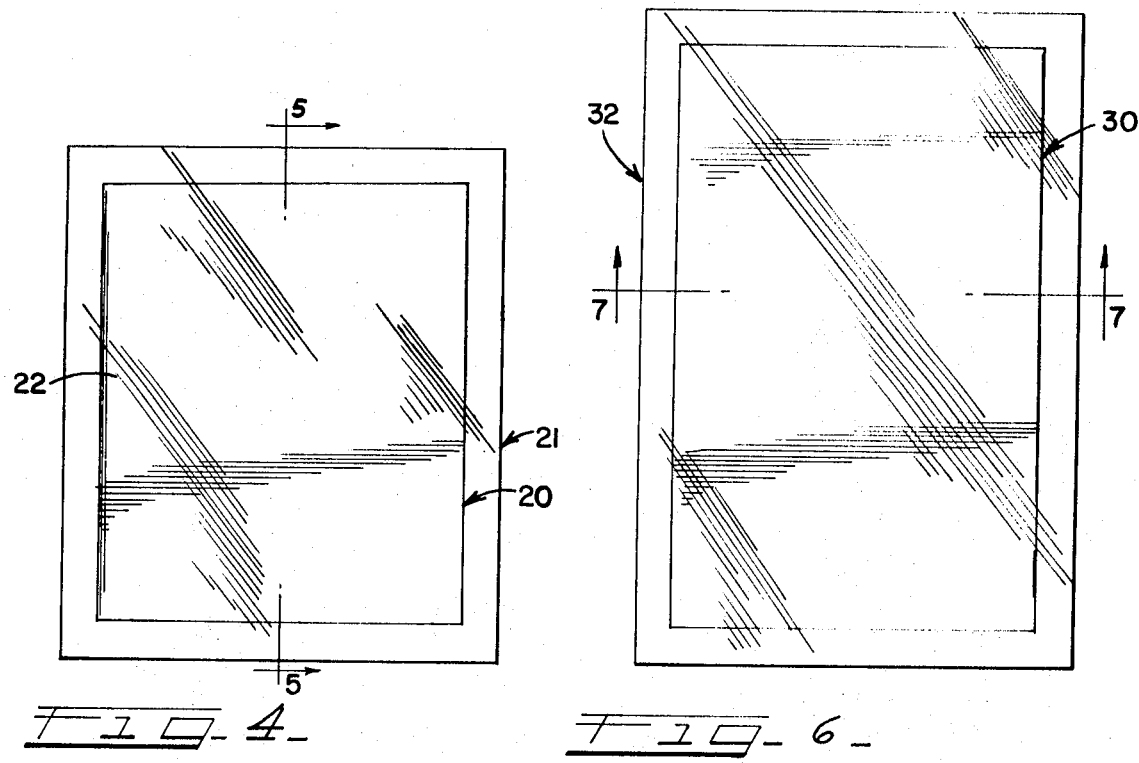
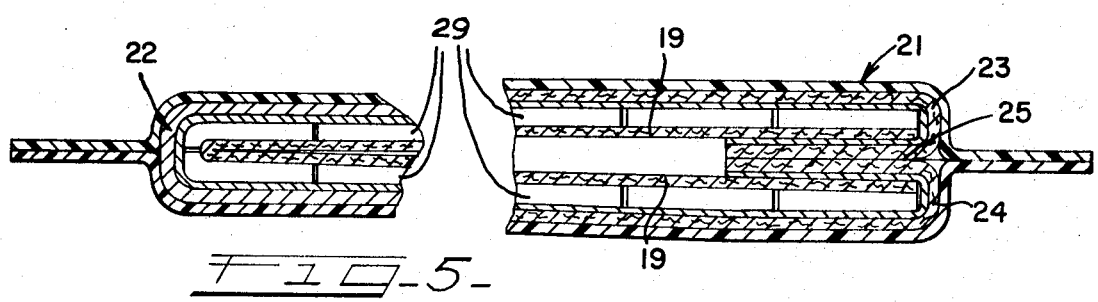
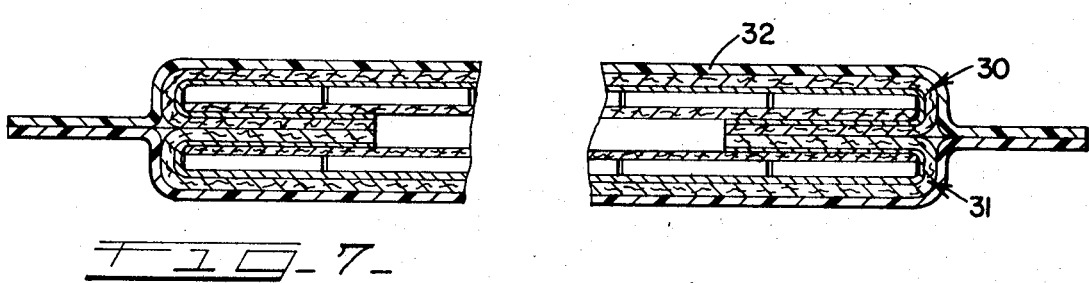

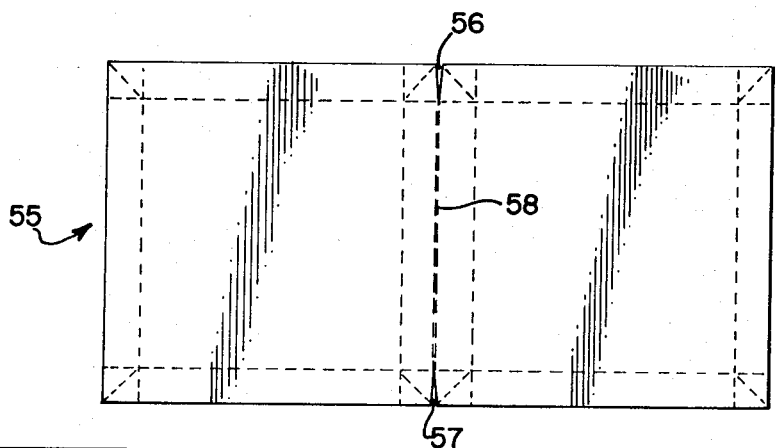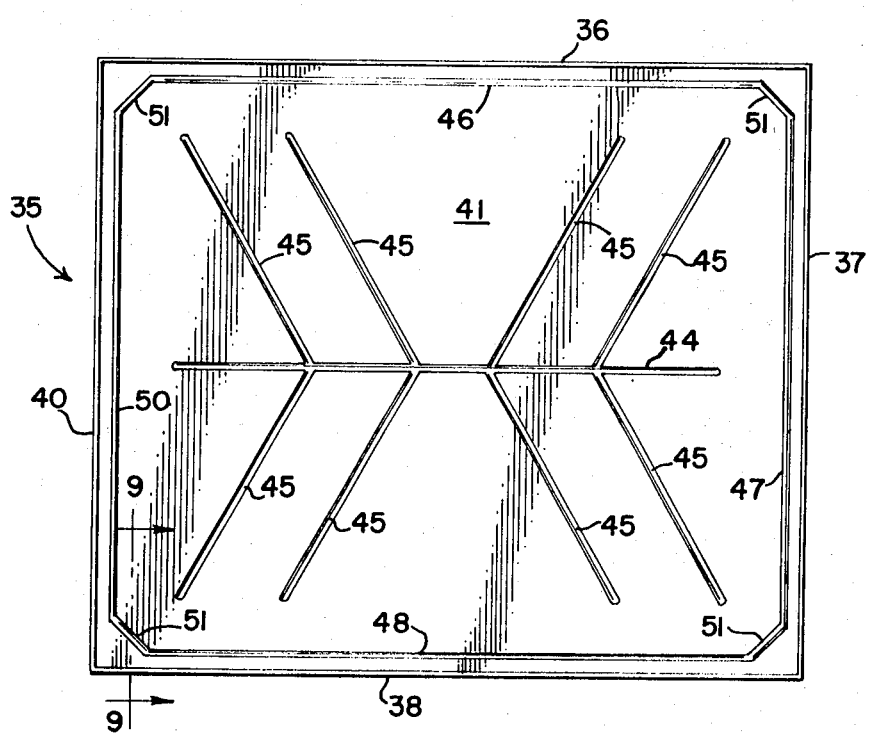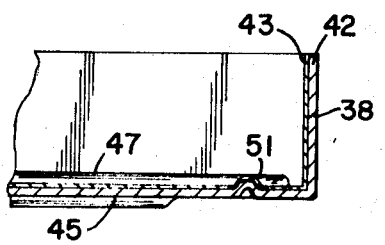

INVENTORS
JOHN C. BARD
RUSSELL H. MAAS
BY Greist, Lockwood, Greenawalt & Dewey
ATT'YS.

HEAT-AND-SERVE PACKAGES FOR PREFRIED BACON AND THE LIKE

In preparing regular bacon, a sliced meat such as Canadian bacon, or sausage and hamburger patties for the table, the housewife normally heats the bacon or other meat item in a frying pan during which a considerable amount of fat or greasy liquid, and/or cooking residue accumulates in the pan. This results in a greasy utensil that has to be washed after the bacon grease or other residue has been disposed of in some way. During frying or cooking, bacon produces a characteristic aroma which is highly desirable in itself but apparently required in order to develop the full characteristic flavor of the bacon. Thus, when bacon is cooked in a sealed container, its flavor does not become fully developed.

The object of the present invention, generally stated, is the provision of generally flat, heat-and-serve packages of sliced prefried bacon or other generally flat prefried meat item, which include a disposable tray having foldable sides formed from sheet material capable of being heated and retaining melted fat, with the slices of bacon or other prefried products being laid flatwise on the bottom of the tray, the sides being folded down over the margins of the bacon, and the assembly being enclosed within impermeable film and then evacuated and hermetically sealed.

Another object of the invention is the provision heat-and-serve packages of the class described wherein the outer barrier film envelope fits the trays of prefried bacon or other similar product sufficiently snugly and tightly so that fat or grease does not migrate to the exteriors of the trays.

Another object of the invention is the provision of packages of prefried bacon and the like of the class and character described wherein the trays are formed of paperboard lined or coated with metal foil and/or other heat- and grease-resistant material such as films or coatings of polycarbonate resin (General Electric Co., Lexan 144), trimethylpentene (TPX of Imperial Chemical Industries, Ltd.) with a continuous grease retaining dike embossed in the bottom of the tray adjacent the margins, thereby making it unnecessary for the corner seams to be fluid tight with respect to hot grease.

Certain other objects of the invention will in part be obvious, and will in part appear hereinafter.

For a more complete understanding of the nature and scope of the invention, reference may now be had to the following detailed description of several presently preferred embodiments thereof in conjunction with the accompanying drawings wherein:

FIG. 4 is a plan view of a second embodiment of the invention wherein a single flat tray of prefried bacon is folded on itself prior to being packaged in an outer film envelope;

FIG. 5 is a magnified sectional view taken on line 5—5 of FIG. 4 with the center portion broken away;

FIG. 6 is a plan view of a third embodiment of the invention wherein two flat trays filled with bacon are placed together and sealed in an outer film envelope;

FIG. 7 is a magnified sectional view taken on line 7—7 of FIG. 6 with the center portion broken away;

FIG. 8 is a top plan view of an empty tray formed of foil-lined paperboard in the opened condition with the foldable sides turned up;

FIG. 9 is a fragmentary sectional view taken on line 9—9 of FIG. 8;

FIG. 10 is a top plan view of a cut and scored tray blank which may be used in connection with still another embodiment of the invention;

Figure 1:
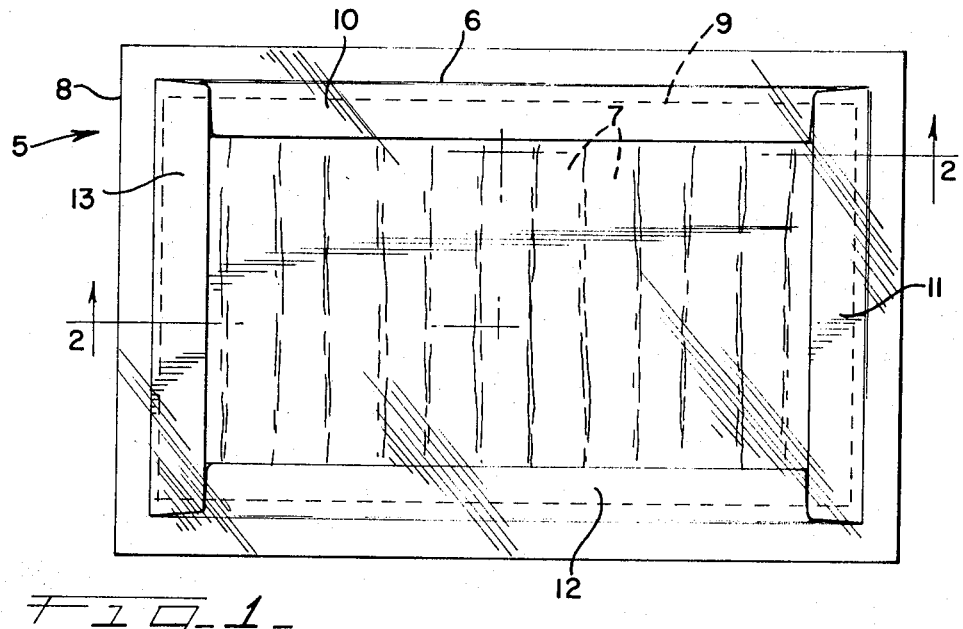
FIG. 1 is a top plan view of what may be considered as the basic form or embodiment of the invention.
Figure 2:
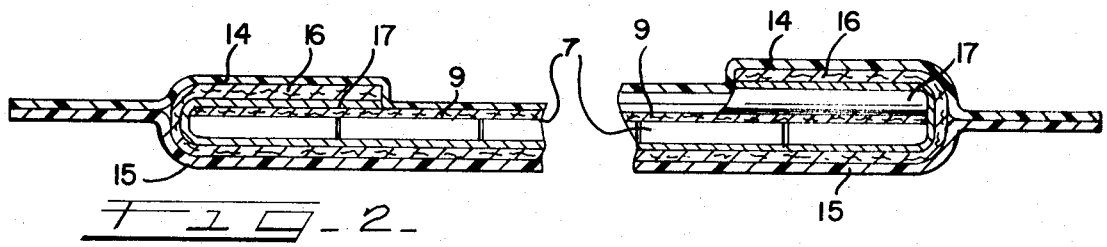
FIG. 2 is a magnified sectional view taken on line 2—2 of FIG. 1 with the center portion broken away.
Figure 3:
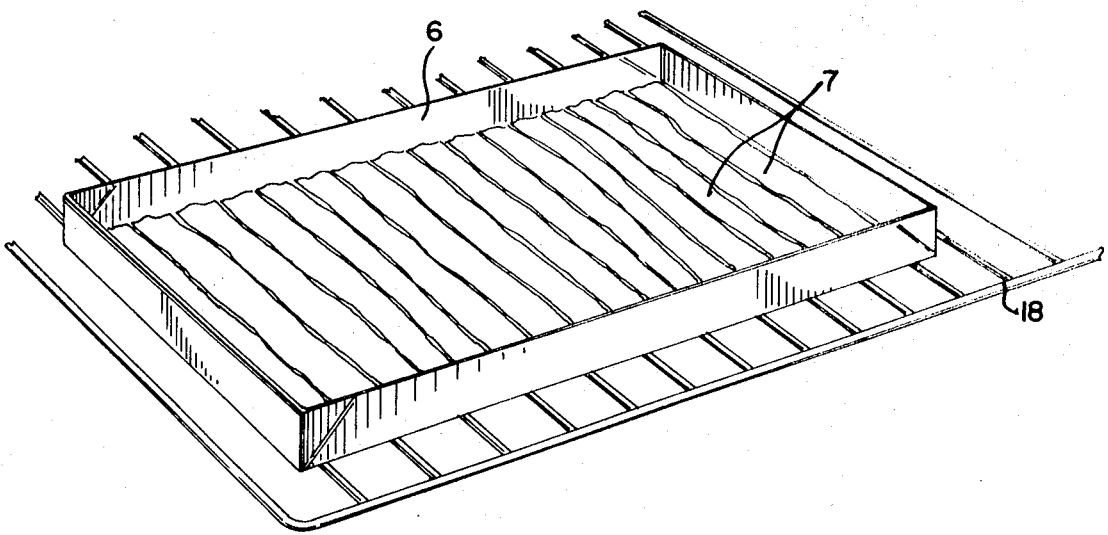
FIG. 3 is a top perspective view showing the disposable tray of the package of FIG. 1 removed from its plastic film envelope and with its sides turned up, the parchment covering sheet removed from the bacon and placed on an oven shelf or grill.

Referring to FIGS. 1–3, a heat-and-serve package of prefried bacon is indicated at 5 comprising a heatable disposable tray 6 having slices of bacon 7—7 laid flatwise therein and hermetically sealed in an evacuated envelope 8 formed of plastic film having suitable barrier properties with respect to air, moisture and fat penetration.

The disposable tray 6 may be formed of paperboard that is lined with metal foil (e.g. aluminum foil) or it may be formed of sufficiently heavy aluminum sheet, e.g. 0.004-inch thickness. Instead of using metal foil, heat- and grease-resistant plastic coatings or laminates of known type may be used, such as polycarbonate or trimethylpentene polymers. Such heat and grease resistant sheet materials are commercially available at relative low cost, and trays may be readily formed therefrom in known manner using known equipment so as to have foldable sides as indicated at 10, 11, 12 and 13 with interconnecting folding corners.

The slices of bacon 7—7 are laid either flatwise or in shingled condition or partially shingled on the bottom of the tray 6 and a grease-resistant covering sheet 9 formed of vegetable parchment or the like is laid over the bacon slices. The sides 10 and 12 are then folded down over the ends of the bacon slices after which the sides 11 and 13 are folded down as shown. The filled tray 6 with the sides turned down as described is hermetically sealed in an envelope 8 formed of impermeable film after the same has been evacuated.

The envelope 8 may initially be in the form of a bag of suitable size or the envelope may be formed in known manner from two webs of the film having the filled tray 6 inserted therebetween with the films being suitably sealed on all four sides around the tray and the resulting envelope cut out from the webs. Packaging machines have been developed and are currently commercially available capable of high-speed evacuation and sealing of plastic envelope-type bags, as well as forming envelopes from opposing sheets of film and evacuating and sealing the same.

Various commercial films are available having suitable barrier properties with respect to air, moisture and fat which may be used for forming the envelope 8 including: saran, polyvinyl chloride, Mylar (polyester film), polycarbonate, Pliofilm, and saran-coated cellophane. Such films may be used alone or in the form of laminates.

A preferred film material from which the envelope 8 may be formed is a laminate comprising one or more plies of saran. Preferably the envelope 8 is formed from the saran film or laminate while it is in the supercooled amorphous condition wherein it is highly formable and the opposite sides of the envelope 8 conform in close detail to the opposite sides of the filled tray. U.S. Pat. No. 3,083,106 discloses apparatus and method whereby evacuated hermetically sealed packages are formed from opposing laminated films of saran in the supercooled amorphous condition.

In FIG. 2 the upper and lower sheets of the plastic film envelope 8 are indicated at 14 and 15 with the tray 6 being shown formed of sheet material comprising a layer of paperboard 16 lined on the interior with aluminum foil 17.

When the envelope 8 is formed from film having the formability of supercooled amorphous saran and the packages are evacuated before being hermetically sealed in known manner as taught for example in U.S. Pat. No. 3,083,106, the envelope 8 will so snugly fit the margins of the bacon filled tray 6 that fat from the bacon will not wick or migrate between the exteriors of the tray 6 and the interior of the envelope 8.

In use, the package 5 of FIGS. 1 and 2 is opened by cutting or otherwise removing the disposable envelope 8, the tray 6 is removed therefrom and sides 10, 11, 12 and 13 thereof are turned up. The removed tray with its sides turned up may be placed on a wire shelf 18 of a prewarmed oven as illustrated in FIG. 3. Preferably the bacon slices 7 are prefried to a net weight which ranges from about 30 to 40 percent of the weight of the uncooked or raw bacon without appreciably shrinking the individual slices. By having the bacon prefried there is substantially less residual fat to render during heating and for the tray 6 to hold and the bacon may be prepared in a much shorter time. For example, the final weight of fully cooked, ready-to-eat bacon slices runs from about 20 to 30 percent of the weight of the raw or uncooked bacon. For example, a tray of prefried bacon may be heated adequately in 4-5 minutes in an oven preheated to 400° F. and the amount of fat that will render will be about 5 to 10 percent of the quantity that renders from ordinary bacon. If the tray of prefried bacon is placed 3 inches under an oven broiler element it will be ready to eat in about 90 seconds. During heating in an oven or on a hotplate, the prefried bacon in the disposable tray 6 will give off the usual bacon aroma or smell and upon eating, the slices will have the full flavor that characterizes fried bacon. It has been found that if prefried bacon is cooked or heated in completely sealed containers or envelopes the flavor does not become fully developed.

Any tendency for fat or grease from the bacon to wick over the folded down sides of the tray 6 and migrate between the film and the outer surface of the tray is minimized by laying over the sliced bacon in the tray before the sides are folded down, the covering piece of grease absorbent paper (e.g. vegetable parchment) 9 which is removed before the bacon is heated.

Foil-lined or metallized trays with foldable sides such as tray 6 are available commercially which will readily withstand heating to 400° F. in an oven, which is high enough to readily heat the prefried bacon. Such material will also withstand heating on a hotplate for short periods of time, but long enough to accomplish heating of the prefried bacon in this manner. When the tray is formed of sheet aluminum, (e.g. 0.004-inch thickness) it may be heated directly over a gas burner or other flame as well as in the oven or on an electric hotplate.

Referring to FIGS. 4 and 5, a second embodiment of the invention is shown therein wherein a flat tray of bacon such as tray 6 in FIG. 1 is folded over on itself and hermetically sealed in an outer film envelope. In FIGS. 4 and 5, such a folded tray filled with bacon is indicated at 20 and the outer film envelope is indicated at 21. The construction on the tray 21, the filling of the same with strips of bacon 29, covering with a sheet of parchment 19 and the folding down of the sides may, of course, follow that for tray 6 in FIG. 1. Then such a filled tray is folded over on itself so that the two ends over lay themselves. The folded filled tray is then inserted in the plastic film bag or envelope 21 may be formed, filled, evacuated and sealed as described in connection with FIG. 1 for the envelope 8. As will be seen from FIG. 5, the fold is on the left-hand side or margin of the package as viewed in FIGS. 4 and 5 and is indicated at 22 while the over lying ends are on the right-hand margin and indicated at 23 and 24 in FIG. 5.

When the outer envelope 21 is formed from supercooled saran in the amorphous condition, or from a laminate containing supercooled saran, and the packages evacuated and hermetically sealed around the margins, the snugness of the envelope to the folded tray is such that the opposing folded margins such as the one designated at 25 along the right-hand vertical edge, will be so tightly held together that wicking or migration of grease or fat onto the outer surfaces of the tray 20 will be prevented even when the pieces of parchment 19 are omitted.

The package of FIGS. 4 and 5 has the advantage that its length is reduced by half of the length of the package of FIGS. 4-3, thereby reducing the film requirement for the same package capacity. In addition, the film in the envelope is substantially completely supported in direct contact with the tray thereby offering maximum protection against accidental puncturing in handling. Furthermore, if the film is punctured or torn, the package contents are not directly exposed.

Referring to FIGS. 6 and 7, the embodiment shown therein is formed of two filled trays 30 and 31 laid or superposed face to face (i.e. bacon to bacon) and hermetically sealed in an outer envelope plastic film 32. The individual trays 30 and 31 may correspond to the tray 6 in FIGS. 1-3. It will be understood that if it is desired to have maximum exposure of the product then the positions of the filled trays 30 and 31 may be reversed and they may be put back to back and hermetically sealed in the envelope 32. Alternately, the trays 30 and 31 may be superposed so that the bacon is exposed through the film on only one side of the completed package.

When the envelope 32 is formed of supercooled saran, or a laminate containing supercooled saran, it is readily practical to so tightly and snugly compress the margins of the opposed filled trays 30 and 31 that wicking or migrating of the fat or grease from the bacon contents to the exteriors of the trays is prevented.

Referring to FIGS. 8 and 9, an empty tray 35 is shown therein with the sides turned up. The tray 35 is formed of foil lined paper board and is of the type that may be used as tray 6 in FIGS. 1-3, for example. The sides of the tray 35 are designated at 36, 37, 38 and 40 with the bottom of the tray being designated at 41. In FIG. 9, the paperboard layer is indicated at 42 and the aluminum foil liner is designated at 43.

The bottom 41 of the tray is provided with a longitudinal groove 44 having branch depressions or grooves 45—45 extending at an angle therefrom. The interconnected depressions or grooves 44 and 45 provide channels for melted fat to be distributed in.

Inwardly from the margins of the bottom 41, it is provided with a grease retaining dike formed by upward scoring or embossing the bottom to provide side and end portions 51—51. The resulting grease-retaining dike prevents hot grease or fat from reaching the corners of the tray and thereby eliminates the necessity of the folding corners of the tray being fluidtight so as to retain the melted grease.

Figure 11:
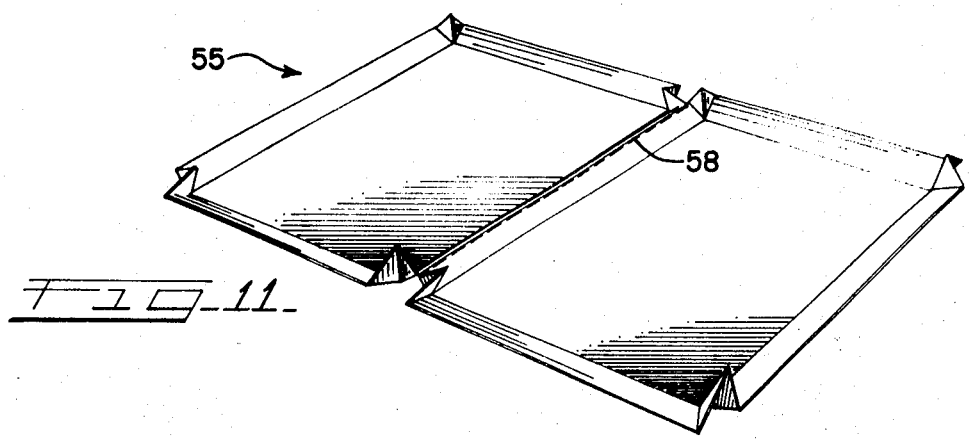
FIG. 11 is a perspective view of a blank of FIG. 10 in the partially folded condition.

Referring to FIG. 10, a precut and scored tray blank is indicated generally at 55 which may be formed of any one of the heatable grease-resistant sheet materials mentioned above. This tray blank 55 may be formed on a quantity production basis by machines of known type so as to have score lines along the margins and in the corners permitting the tray blank to be folded into two separate containers as indicated in FIG. 11. In order to facilitate the separation of the tray blank 55 by the customer into two separate trays, two V-cuts 56 and 57 are died out on opposite ends of a line of perforations 58. Whereas, the other score lines indicated in FIG. 10 do not penetrate the sheet material, the line of perforations 58 does involve perforating the sheet material in known manner.

Figure 12:
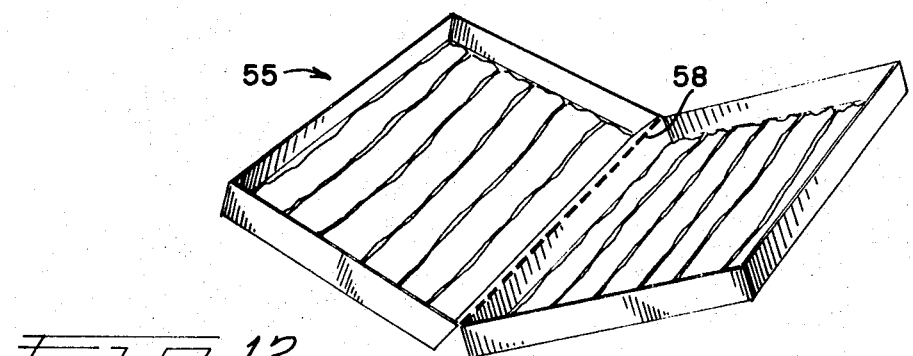
FIG. 12 is a perspective view showing the fully erected tray formed from the blank of FIGS. 10 and 11 filled with slices of prefried bacon; and, FIG. 13 is a perspective view showing the filled tray of FIG. 12 separated into two halves.
Figure 13:
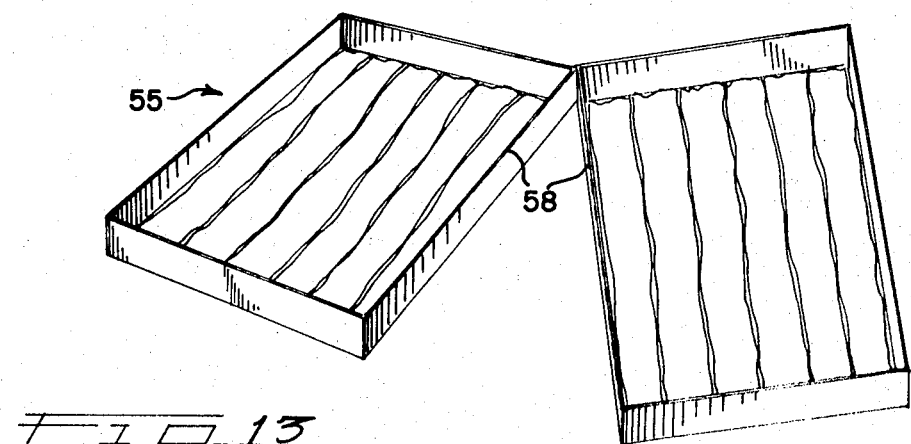

In use, the tray blanks 55 are folded along the score lines so as to form pockets as indicated in FIG. 11 and then the strips of flat bacon or other items are laid in the pockets as indicated in FIG. 12. A piece of grease-resistant paper, e.g. vegetable parchment, is then laid over the bacon in one of the halves and the sides and ends of the respective pockets are folded down over the bacon thereby forming a closed package which is hinged at the line of perforations 58. This packet is then enclosed in an outer envelope or bag of film in the manner described above in connection with the embodiments shown in FIGS. 1-7. In use, the consumer opens the outer envelope and removes the inner folded packet and then separates one side or half thereof from the other in the manner illustrated in FIG. 13. The sheet of parchment paper is left in place of the half that is not to be used for the time being. The sides of the half that are to be used are straightened up so as to form a tray and this half with its contents is heated as described above.

While the present invention is particularly useful and suited for packaging slices of prefried bacon, it will be understood that slices of other prefried meat items may be packaged including slices of prefried Canadian bacon, slices of prefried ham, slicelike patties of prefried hamburger and pork sausage.

We claim:

1. A compact generally flat heat-and-serve package of slicelike meat product comprising a disposable oven-heatable tray formed with interconnected foldable sides from sheet material capable of retaining melted fat and greasy liquid, slicelike meat product from which fat or greasy liquid renders on heating laid generally flatwise over the bottom of said tray with the sides thereof folded inwardly and downwardly over the margins of said slicelike contents, and disposable film having air, moisture and grease barrier properties enclosing at least the top side of said tray, said sides being erectable on removal of said film to form a continuous upstanding sidewall around said tray bottom.

2. The heat-and-serve package of claim 1 wherein said slicelike contents is prefried bacon.

3. The heat-and-serve package of claim 1 wherein said disposable film is in the form of an envelope completely enclosing said tray and slicelike contents.

4. The heat-and-serve package of claim 1 wherein said package is evacuated and hermetically sealed.

5. The heat-and-serve package of claim 1 wherein said disposable film comprises saran applied in the supercooled condition.

6. The heat-and-serve package of claim 1 wherein said tray with slicelike contents therein is doubled over on itself and evacuated and hermetically sealed in an envelope formed of said disposable film.

7. The heat-and-serve package of claim 1 wherein said tray is formed of paperboard to which aluminum foil is laminated on the interior.

8. The heat-and-serve package of claim 7 wherein the bottom of said tray is scored to provide a continuous dike inwardly spaced from the margins of the bottom.

9. The heat-and-serve package of claim 1 wherein said tray is formed of aluminum foil.

10. The heat-and-serve package of claim 1 wherein the interior surface of said tray is formed of heat and grease resistant plastic.

11. The heat-and-serve package of claim 1 wherein said tray is separable into a plurality of smaller trays with foldable sides.

12. The heat-and-serve package of claim 1 wherein at least two of said filled trays are superposed and said removable film is in the form of an evacuated and hermetically sealed envelope.

UNITED STATES PATENT OFFICE
CERTIFICATE OF CORRECTION

Patent No. 3,619,215  Dated November 9, 1971

Inventor(s) John C. Bard and Russell H. Maas

It is certified that error appears in the above-identified patent and that said Letters Patent are hereby corrected as shown below:

Column 3, line 70, delete "4-3" and insert in place thereof --1-3--.

Column 4, line 33, after the word "portions" insert --46, 47, 48 and 50 interconnected by four corner portions--.

Signed and sealed this 23rd day of May 1972.

(SEAL)
Attest:

EDWARD M. FLETCHER, JR.  ROBERT GOTTSCHALK
Attesting Officer  Commissioner of Patents